United States Patent [19]

Economou

[11] 4,346,178
[45] Aug. 24, 1982

[54] STRUCTURED KAOLIN AGGLOMERATES AND METHODS OF MAKING THE SAME

[75] Inventor: Peter Economou, Millington, N.J.

[73] Assignee: Yara Engineering Corporation, Elizabeth, N.J.

[21] Appl. No.: 287,026

[22] Filed: Jul. 27, 1981

[51] Int. Cl.$^3$ .............................................. C09C 3/08
[52] U.S. Cl. ................................ 501/148; 106/308 N
[58] Field of Search ........... 501/148; 106/288, 308 N; 428/404, 407

[56] References Cited

U.S. PATENT DOCUMENTS 3,912,532 10/1975 Simone ............................ 106/308 N Primary Examiner—James Poer
Attorney, Agent, or Firm—Buell, Blenko, Ziesenheim & Beck

[57] ABSTRACT

Kaolin (clay) platelets in water are flocculated with an acid (pH 3.0) to form "structured agglomerates", which are stabilized by reacting with an urea-formaldehyde prepolymer. The urea-formaldehyde prepolymer forms polymeric agglomerated particles when it comes in contact with the catalytic, acidic kaolin "structured agglomerates." The urea-formaldehyde polymeric agglomerated particles cause adhesion or stabilizing of the structured kaolin agglomerates to form a three-dimensional network of "open structure" with a large number of microvoids (pores). The urea-formaldehyde polymer in the stabilized product varies from 5 to 95% by weight based on the total weight of the final product.

The size of the primary particles of the urea-formaldehyde polymer is from 0.1 to 0.7$\mu$ (micron). The size of the kaolin platelets is from 0.1 to 10$\mu$ (microns). The structured agglomerates of kaolin-urea-formaldehyde possess a size ranging from 0.25 to 40$\mu$ (microns).

15 Claims, 3 Drawing Figures

STRUCTURED KAOLIN AGGLOMERATES AND METHODS OF MAKING THE SAME

This invention relates to structured kaolin agglomerates and methods of making the same and particularly to structured kaolin agglomerates which are stabilized with ureaformaldehyde polymer.

BACKGROUND OF THE INVENTION

Natural and calcined clays are used as opacifying pigments and extenders of $TiO_2$ (titanium dioxide) in paper filler applications, paper coating and paint formulations. The opacifying strength of a pigment is expressed by a measurable property, the so-called "Pigment Scattering Coefficient," Sp, which is based on the Kubelka-Munk theory. The pigment scattering coefficients are determined by measuring the absolute reflectances, $R_0$ (black body backing) and $R_w$ (white body backing of known reflectance), of thin, uniformly deposited layer of pigment on a substrate of known reflectances. Clay pigments are much less expensive than prime pigments, such as $TiO_2$; and their pigment scattering coefficients, that is, opacifying strength, are considerably lower than those of $TiO_2$ (see Table I, Pigment Scattering Coefficients, Sp):

TABLE I
PIGMENT SCATTERING COEFFICIENTS (Sp)

|  | $cm^2/g$. |
|---|---|
| Clays | 670–1,250 |
| Calcined Clays | 1,800–2,150 |
| $TiO_2$ (Anatase) | 4,000–4,800 |
| $TiO_2$ (Rutile) | 4,600–5,100 |
| U/F Pigments | 3,500–4,200 |

Peter Economou, John F. Hardy and Alfred Renner, in a recent U.S. Pat. No. 3,909,348, described the high opacifying properties of urea-formaldehyde pigments in paper filler applications. The pigment scattering coefficients, Sp, of urea-formaldehyde pigments approach those of $TiO_2$, anatase grade. However, the urea-formaldehyde pigments are equally as expensive as $TiO_2$.

Dominic Simone, of NL Industries, Inc., describes in his U.S. Pat. No. 3,912,532 the opacifying properties of clay coated with urea-formaldehyde particles in paper filler and paper coating applications. Simone in his invention describes clay particles which are encapsulated with a coating of finely divided particles of urea-formaldehyde polymer, which have been formed and polymerized onto the surface of the clay particles. Simone pretreats well dispersed clay particles in water with urea-formaldehyde prepolymer and then adds the acid catalyst to polymerize the ure-formaldehyde prepolymer.

The present invention relates to the high opacifying strength of flocculated clay particles (as opposed to dispersed clay mentioned in the Simone patent) which are treated with an acid to form "structured agglomerates," which are then stabilized with urea-formaldehyde polymeric particles. The acid used to flocculate the clay particles is also the catalyst for the urea-formaldehyde polymerization. Due to the very thixotropic character of the flocculated clay particles in water and, in an attempt to produce products with "open structure" or maximum possible number of microvoids of desirable size, th solids of clay slurries and of the urea-formaldehyde prepolymer of this invention are considerably lower than the concentrations stated in Simone's examples. As a result of these major differences between Simone's invention and this invention, the pigment scattering coefficients of products made by this invention are considerably higher than the pigment scattering coefficients of the products made by Simone's inventioon, when both products have the same clay/urea-formaldehyde polymer weight ratio.

SUMMARY OF THE INVENTION

Natuurally occurring or mechanically delaminated clay platelets in water suspensions are treated with an acid to a pH less than 3.0 to form a very viscous flocculated clay slurry. The acid treatment causes the clay platelets to flocculate preferably by "face" to "edge" contact and form "structured agglomerates," which possess high void volume and high power to scatter light. These "structured agglomerates" of clay are then stabilized (or frozen in position) by the addition of a urea-formaldehyde prepolymer under strong agitation. Accordingly by the term structured agglomerates, I mean a structure of separate clay particles agglomerate in a manner such that a substantial number of particles are in edge to face contact forming a porous structure. The urea-formaldehyde prepolymer, upon contact with the acidic clay agglomerates (which act as a catalyst), polymerizes almost instantaneously to form essentially spherical sub-micron size polymeric particles which glue and stabilize the clay "structured agglomerates." The resulting product is a three-dimensional network of agglomerates of urea-formaldehyde polymeric particles and clay platelets of "open structure" which possesses a large number of microvoids (pores). The high number and controlled size of microvoids contribute to high scattering coefficient (Sp) or opacity.

The amount of urea-formaldehyde polymer in the final product can be varied from 5 to 95% by weight based on the total weight of the product. The urea-formaldehyde polymer is composed of primary particles essentially spherical and non-porous of 0.1 to 0.7 micron ($\mu$) size. The clay platelets are of 0.1 to 10 microns ($\mu$) size.

The final product consists of "open structure" agglomerates of urea-formaldehyde essentially spherical particles and clay platelets. The said agglomerates possess a size of 0.25 to 40 microns. The detailed method of preparing these products is described hereafter.

DESCRIPTION OF THE PREFERRED EMBODIMENTS

The products are made by flocculating clay slurries in water with an acid to form "structured agglomerates." The clay agglomerates then are stabilized or frozen by treatment with an urea-formaldehyde prepolymer.

The urea-formaldehyde prepolymer water solution consists of 25 to 50% solids by weight and a molar ratio of urea to formaldehyde from about 1:1.3 to about 1:1.8.

The clay platelets of size 0.1 to 10$\mu$ are slurried in water to about 10 to 40% solids by weight and treated with an acid to form "structured agglomerates" of viscous clay slurry. The amount of acid used for the clay treatment is sufficient to bring the pH below 3.0 and, preferably, below 2.5. The flocculated form of the clay slurry is heated preferably to 50° C., however, any temperature from 30° to 80° C. is suitable. To this mixture an urea-formaldehyde prepolymer solution at preferably 50° C. (or 30° to 80° C.) is added under strong agitation to stabilize or freeze the "structured agglomerates" of clay platelets. The urea-formaldehyde prepolymer, upon contact with the acidic clay slurry, polymerizes very rapidly to form a gel-like mixture. The gel-like mixture is then left to cure for 1 to 3 hours in order to increase the polymer yield. During the gelation step and curing period, the temperature of the mixture is increasing by 5° to 20° C. because the condensation polymerization of the urea-formaldehyde system is an exothermic reaction. The amounts of urea-formaldehyde polymer employed in the gel mixture are from 5 to 95% by weight based on the total weight of clay and urea-formaldehyde particles. The final total solids of the gel mixture is between 20 and 45% by weight.

After the curing period, the gel-like mixture is crushed and slurried with approximately an equal volume of water. The slurry is then neutralized by a base to a pH of 6.0 to 8.0. The slurry then is filtered and the filter cake is washed with water. The filter cake is then dried in an oven or flash dryer and micropulverized. The agglomerate size of the micropulverized final product ranges from 0.25 to 40μ.

In the foregoing I have outlined certain objects, purposes and advantages of this invention. Other objects, purposes and advantages of this invention will be apparent from the following examples and the drawings in which:

FIG. 1 is a flow sheet illustrating the process of this invention compared with the prior art process of Simone U.s. Pat. No. 3,912,532.

Figure 1:
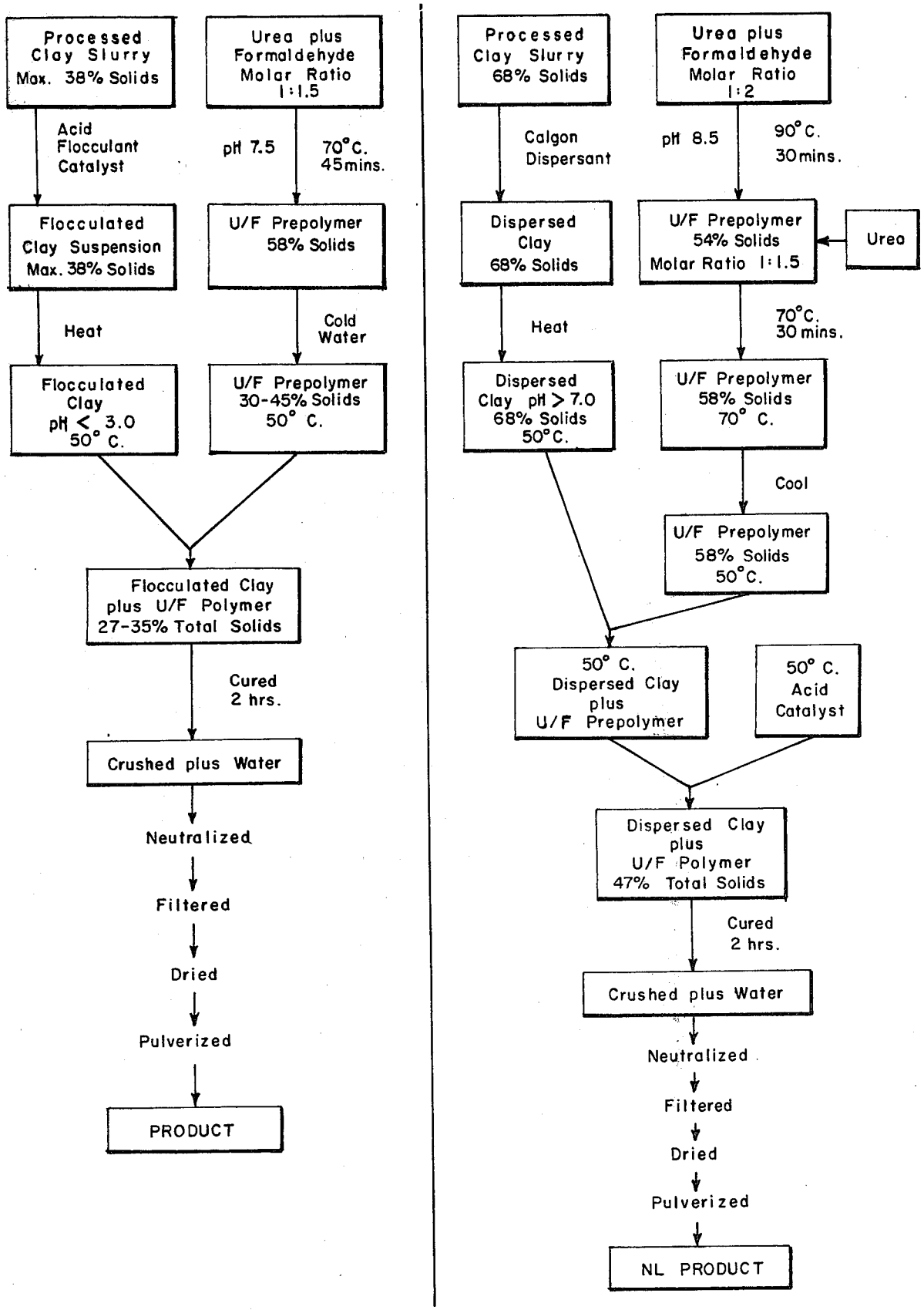
Figure 2:
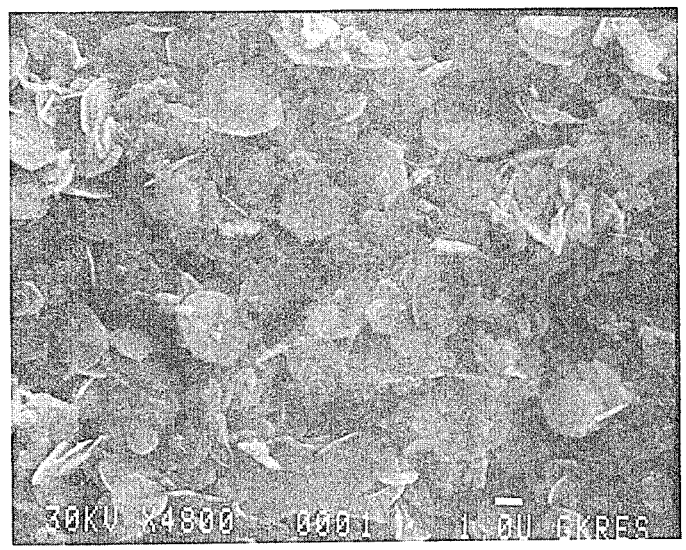
FIG. 2 is a scanning electron micrograph at 4,800 magnifications of a structured kaolin agglomerate stabilized with urea-formaldehyde as prepared by this invention.
Figure 3:
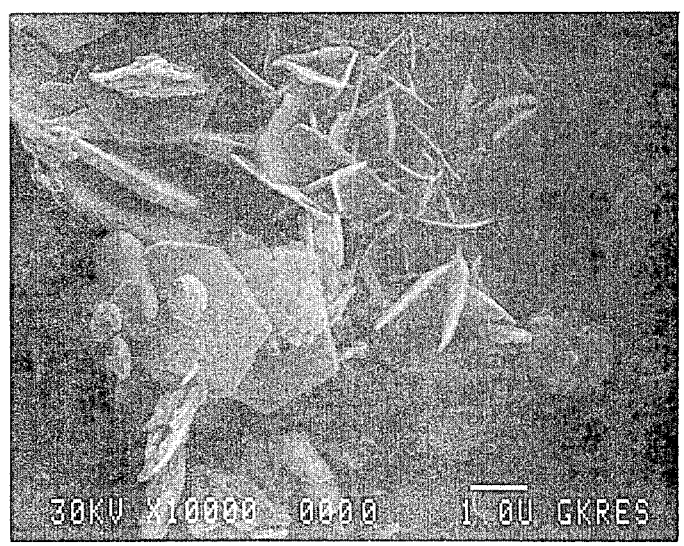
FIG. 3 is a scanning electron micrograph at 10,000 magnifications of a portion of the same product as in FIG. 2.

Referring to the drawings, I have illustrated in flow sheet form the process of this invention compared with the Simone process, the differences being noted in italics. In FIGS. 2 and 3, the scanning micrographs show the highly structured, porous agglomerate form of the product of this invention which produces the unusual properties herein described.

In the following examples I have compared the product of this invention with the product of Simone U.S. Pat. No. 3,912,532, which I believe is probably the most pertinent available art. Those examples designated with the suffix "A" were carried out according to the present invention while those designated with the suffix "B" were carried out according to the teachings of Simone U.S. Pat. No. 3,912,532.

EXAMPLE 1 A 729 g. of an aqueous formaldehyde solution of 37% concentration were neutralized with a sodium hydroxide solution to a pH of 8.5. 270 g. of urea were added and the mixture condensed for ½ hour at 90° C. At the end of this period, 90 g. of urea was added and the temperature adjusted to 70° C. This urea-formaldehyde prepolymer is an exact replica of the U/F prepolymer described in Example 1 of Simone's U.S. Pat. No. 3,912,532. The total reactants solids are 57.85% by weight with a final molar ratio of urea of formaldehyde, 1:1.5. This U/F prepolymer was used in Example 1 A to stabilize clay "structured agglomerates" of this invention, as well as in Example 1 B to treat the same clay but in dispersed condition, as it is described in Example 1 of Simone's U.S. Pat. No. 3,912,532, for the purpose of comparing the performance differences between the two products prepared by this invention and Simone's invention.

The condensation reaction was then continued for an additional half hour to form the urea-formaldehyde prepolymer.

420 g. of kaolin clay were slurried in 400 g. of deionized water. No dispersant, such as sodium hexametaphosphate, was used. The clay slurry was then treated with a solution of 6.4 g. of sulfamic acid in 364 g. of water. The clay slurry, at this point, becomes very viscous due to the formation of "structured agglomerates" of clay platelets. 1.5 g. of oxalic acid crystals were added to the acid treated clay and the temperature was adjusted to 50° C. It has been found that oxalic acid, 0.1 to 0.5% by weight based on clay solids, reduces the viscosity of the flocculated clay slurry to some extent, and it assists the mixing of the viscous clay slurry when the urea-formaldehyde prepolymer is added to stabilize the clay agglomerates. It is the opinion of this inventor that oxalic acid acts as a digestive agent, it breaks down large clay agglomerates into smaller ones. Also, it has been found that the oxalic acid is not needed if the clay slurry is further diluted with water.

The flocculated clay slurry at 50° C. was then mixed with 360 g. of the urea-formaldehyde prepolymer, also at 50° C. The condensation polymerization of the urea-formaldehyde prepolymer takes place as soon as it is mixed with the acidic flocculated clay slurry and the exothermic reaction increases the temperature of 68° C. The gel-like mixture was then allowed to cure at this temperature adiabatically for 2 hours.

The gel-like mixture was crushed to small pieces and mixed with 1 liter of water, neutralized with a NaOH solution to pH 8.0, filtered, and the filter cake was washed with 100 ml. of water. The filter cake was dried at 70° C. and the dried product was then micropulverized with an impact stud pulverizer.

The initial clay to urea-formaldehyde prepolymer weight ratio of this example was 66.9 to 33.1, and the final weight ratio of clay to urea-formaldehyde polymer, as it was determined from % ash analysis, was 73.9 to 26.1. This difference, between the initial weight ratio of clay to urea-formaldehyde prepolymer before gelation and that of the final product, is due to the formation of water from the condensation polymerization of the urea-formaldehyde prepolymer.

The total solids at the final gelation step of the mixture was 41% by weight based on the total weight of the components.

The clay particles used in this example had an average particle size of 0.77μ. The urea-formaldehyde primary particles had an average size of 0.25μ. The clay-urea-formaldehyde polymer agglomerates had an average size of 5μ.

The properties of Example 1 A product are listed in Table II with the properties of Example 1 B product for comparison.

EXAMPLE 1 B

In this example the same raw materials were used as in Example 1 A except for the procedure, which is an exact repeat of the Simone's U.S. Pat. No. 3,912,532, Example 1.

420 g. of kaolin clay were dispersed in 200 g. of deionized water containing in solution 0.42 g. of sodium hexametaphosphate as a dispersant.

The clay dispersion was mixed with 360 g. of the urea-formaldehyde prepolymer solution and the temperature of the slurry was adjusted to 50° C.

A solution of 6.4 g. of sulfamic acid in 364 g. of deionized water was prepared and heated to 50° C.

The clay dispersion in the urea-formaldehyde prepolymer solution was mixed with the acid solution and the precipitated resin formed a gel which on standing was allowed to cure for 2 hours at 65° C.

The gelled mass was broken up and was dispersed in 1 liter of water, neutralized with NaOH solution to pH 7.5, filtered, washed on the filter with some additional water, then dried at 75° C. The dried product was then passed through an impact stud pulverizer.

The initial clay to urea-formaldehyde prepolymer weight ratio of this example was the same as in Example 1 A (66.9 to 33.1) and the final clay to urea-formaldehyde polymer weight ratio, as it was determined from % ash analysis, was 73.7/26.3.

The clay particles used in this example had an average particle size of $0.77\mu$. The urea-formaldehyde particles coating the clay particles had an average size of $0.2\mu$. The coated clay particles had an average size of $6\mu$.

The products of Examples 1 A or 1 B were used in a paper coating formulation as follows:

100 parts of either product from Example 1 A or 1 B was mixed with 16 parts of a styrene-butadiene latex (50% solids). A third coating formulation containing 100 parts of the untreated clay was prepared as a control.

A 28 lbs./book ream base stock paper was coated on one side with the three coating compositions at a coat weight of 2.3 lbs./book ream.

The coated papers were calendered one at 400 pli and at a speed of 37 feet/minute.

The same products of Examples 1 A and 1 B were used as filler pigments in paper. The pulp used for this evaluation was a 50/50 Hardwood/Softwood Kraft bleached pulp of Canadian Standard Freeness of 40 c.c. The paper formed contained 2, 4, and 6% by weight of the filler pigment based on the total weight solids of paper. The basis weight of the paper was 50 lbs./book ream. (A book ream is 500 sheets of 25"×28" or 475,000 square inches or about 3300 square feet.)

The results of these comparative evaluations of the products of Examples 1 A and 1 B, as well as other pigment characteristic properties, are tabulated in Table II.

calendered and calendered sheets, the Example 1A product gives higher % opacity by 1.4 and 0.8 points correspondingly than the Example 1B product. The brightness of the coated paper is also higher by 1.3 and 1.1 points, and the pigment scattering coefficients of coatings differ by 39.4% and 19.7% corresponding to uncalendered and calendered sheets.

In paper filler applications, the Example 1A product increased the % opacity of paper by 1.0 point higher than the Example 1B product at the 2% pigment level and by 2.6 points at the 6% pigment level. Differences in the brightness of the filled papers of 0.7 point at 2% pigment level and 1.5 points at 6% pigment level are observed too.

The superior performance of the Example 1A product of this invention over that of the Example 1B product of Simone's invention in both paper filler and coating applications is due to the unique "open structure" of clay "structured agglomerates," which were stabilized with agglomerates of sub-micron size urea-formaldehyde polymeric particles. The clay "structured agglomerates" are called stabilized because slurries of the products of this invention hold their original structure under any normal dispersing conditions with any common dispersing agents.

The bulk density of Example 1A product (0.206 g/c.c.) is 28% lower than the bulk density of Example 1B (0.264 g/c.c.).

EXAMPLE 2A 1332 g. of an aqueous formaldehyde solution of 37% concentration were neutralized with a sodium hydroxide solution to a pH of 8.0. 657 g. of urea were added and the mixture solution of urea and formaldehyde was reacted for 45 minutes at 70° C. During this period the pH was maintained between 7.0 and 7.5. At the end of the 45 minute period, 568 g. of deionized cold water were added and the temperature was decreased and maintained at 50° C. until the urea-formaldehyde prepolymer was used. This urea-formaldehyde prepolymer, preferably used in the present invention, is a simplified single step method and less expensive than Simone's method. The final solids of this urea-formaldehyde prepolymer are 45% by weight based on the total weight of the reactants, and the molar ratio of urea to formaldehyde is 1:1.5.

350 g. of kaolin clay were slurried in 701 g. of deionized water. No dispersant, such as sodium hexametaphosphate, was used. The clay slurry was then treated

TABLE II

| | Pigment Properties | | PAPER COATINGS | | | | | | PAPER FILLER | | | | | |
| | | | Uncalendered | | | Calendered | | | Opacity, % % Pigment | | | Brightness % Pigment | | |
| Example | Brightness | Scattering Coefficient, Sp cm$^2$/g. | Opacity % | Brightness | Scattering Coefficient, Sp cm$^2$/g. | Opacity % | Brightness | Scattering Coefficient, Sp cm$^2$/g. | 2 | 4 | 6 | 2 | 4 | 6 |
|---|---|---|---|---|---|---|---|---|---|---|---|---|---|---|
| 1 A | 89.3 | 2550 | 89.8 | 76.2 | 3220 | 87.8 | 74.3 | 2490 | 81.2 | 85.5 | 88.4 | 83.6 | 85.3 | 86.7 |
| 1 B | 88.2 | 2300 | 88.4 | 74.9 | 2310 | 87.0 | 73.2 | 2080 | 80.2 | 82.9 | 85.8 | 82.9 | 84.2 | 85.2 |
| Clay | 84.8 | 1020 | 86.3 | 73.0 | 1160 | 85.3 | 70.5 | 1150 | | | | | | |
| | | | | | | | | | Pulp % Opacity 77.2 | | | Pulp Brightness 82.0 | | |

The results in Table II indicate clearly the differences in product performance between the product of Example 1 A of this invention and the product of Example 1B of Simone's invention (U.S. Pat. No. 3,912,532). Example 1A product has 1.1 points higher brightness and 10.9% higher pigment scattering coefficient than Example 1B product. In paper coating applications of unwith 60 g. of 9% by weight solution of sulfamic acid, 0.7 g. of oxalic acid, and the temperature was adjusted to 50° C.

The acid flocculated clay slurry at 55° C. was then mixed with 333 g. of the urea-formaldehyde prepolymer, also at 55° C. The condensation polymerization of the urea-formaldehyde prepolymer takes place as soon as it is mixed with the acidic flocculated clay slurry and the exothermic reaction increases the temperature to 63° C. The gel-like mixture was then allowed to cure at this temperature adiabatically for 2 hours.

The gel-like solid mixture was crushed to small pieces and mixed with 750 ml. of water, neutralized with a NaOH solution to pH 8.0, filtered and the filter cake was washed with 80 ml. of water. The filter cake was dried at 75° C. and the dried product was then micropulverized with an impact stud pulverizer.

The initial clay to urea-formaldehyde prepolymer weight ratio of this example was 70 to 30, and the final weight ratio of clay to urea-formaldehyde polymer, as it was determined from % ash analysis, was 77 to 23. The total solids at the gelation step of this mixture was 35% by weight based on the total weight of the components.

The clay particles used in this example had an average particle size of $0.2\mu$. The urea-formaldehyde primary particles had an average size of $0.3\mu$. The clay-urea-formaldehyde polymer agglomerates had an average size of $6\mu$.

The properties of Example 2A product of this invention are listed in Table III with the properties of the Example 2B product, made by Simone's method, for comparison.

EXAMPLE 2B

In this example the same raw materials were used as in Example 2A except for the procedure, which is the same as that described by Simone in his U.S. Pat. No. 3,912,532.

350 g. of kaolin clay were dispersed in 233 g. of deionized water containing in solution 0.35 g. of sodium hexametaphosphate as a dispersant. The clay dispersion was mixed with 333 g. of the urea-formaldehyde prepolymer solution (the same U/F prepolymer as in Example 2A) and the temperature of the mixture was adjusted to 55° C.

A solution of 60 g. of 9% sulfamic acid (by weight) was heated to 55° C.

The clay dispersion in the urea-formaldehyde prepolymer was mixed with the sulfamic acid solution and the precipitated resin formed a gel which on standing was allowed to cure for 2 hours at 71° C. adiabatically.

The gelled mass was broken up and was dispersed in 750 ml. of water, neutralized with NaOH solution to pH 7.5, filtered, washed with 80 ml. of water, then dried at 75° C. The dried product was then passed through an impact stud pulverizer.

The initial clay to urea-formaldehyde prepolymer weight ratio of this mixture was the same as in Example 2A (70 to 30) and the final clay to urea-formaldehyde polymer weight ratio, as it was determined from % ash analysis, was 77 to 23.

Again, the clay particles used in this example had an average particle size of $0.2\mu$. The urea-formaldehyde particles coating the clay particles had an average size of $0.2\mu$. The coating clay particles had an average size of $6\mu$.

The products of Examples 2A and 2B were used in a paper coating formulation as follows:

100 parts of either product from Example 2A or 2B was mixed with 16 parts of a styrene-butadiene latex (50% solids).

A 28 lbs./book ream base stock paper was coated on one side with the two coating compositions at a coat weight of 2.7 lbs./book ream.

The coated papers were calendered one at 400 pli and at a speed of 37 feet/minute.

The same products of Examples 2A and 2B were used as filler pigments in paper. The pulp used for this evaluation was a 50/50 blend of Hardwood/Softwood Kraft bleached pulp of 400 cc. Canadian Standard Freeness. The paper formed contained 5%, 10% and 15%, by weight of the filler pigment based on the total solids of paper. The basis weight of the paper was 50 lbs./book ream.

The results of these comparative evaluations of the products of Examples 2A and 2B, as well as other pigment optical properties, are tabulated in Table III.

TABLE III

| | Pigment Properties | | | PAPER COATINGS | | | | | |
|---|---|---|---|---|---|---|---|---|---|
| | | | | Uncalendered | | | Calendered | | |
| Example | Bulk Density g./c.c. | Brightness | Scattering Coefficient Sp, cm²/g | Opacity % | Brightness | Scattering Coefficient Sp, cm²/g | Opacity % | Brightness | Scattering Coefficient Sp, cm²/g |
| 2 A | 0.130 | 91.0 | 2,190 | 89.9 | 77.5 | 2,430 | 87.8 | 74.3 | 1,780 |
| 2 B | 0.199 | 90.0 | 1,810 | 88.5 | 76.3 | 2,180 | 86.8 | 73.3 | 1,580 |
| Clay | 0.240 | 86.9 | 1,280 | | | | | | |

| | PAPER FILLER | | | | | | | | |
|---|---|---|---|---|---|---|---|---|---|
| | % OPACITY % Pigment | | | BRIGHTNESS % Pigment | | | Pigment Scattering Coefficient cm²/g % Pigment | | |
| Example | 5 | 10 | 15 | 5 | 10 | 15 | 5 | 10 | 15 |
| 2 A | 86.7 | 89.4 | 91.1 | 83.3 | 84.7 | 85.5 | 2,520 | 2,240 | 2,170 |
| 2 B | 85.8 | 88.2 | 89.8 | 83.1 | 84.1 | 84.5 | 1,910 | 1,880 | 1,780 |
| | Pulp % Opacity 81.7 | | | Pulp Brightness 80.5 | | | Pulp Scattering Coefficient 338 | | |

The results in Table III show, again, substantial differences in product optical properties and performance characteristics between the product of Example 2A of this invention and the product of Example 2B of Simone's invention (U.S. Pat. No. 3,912,532). Example 2A product has 1.0 point higher brightness and 21% higher pigment scattering coefficient (Sp) than Example 2B product. Also, the bulk density of product 2A is 35% lower than product 2B. In paper coating applications of uncalendered and calendered sheets, again Example 2A product gives higher % opacity by 1.4 and 1.0 points correspondingly than the Example 2B product. The brightness of the coated paper with Example 2A product is also higher by 1.2 and 1.0 points than the coated paper with Example 2B product, and the pigment scattering coefficients of coatings differ by 11.5% and 12.6% corresponding to uncalendered and calendered sheets.

In paper filler applications product 2A of this invention imparted higher opacity, brightness and pigment scattering coefficients than the 2B product of Simone's invention.

EXAMPLE 3A 450 g. of kaolin clay were slurried in 1,000 g. of deionized water. No dispersant, such as sodium hexametaphosphate, was used. The clay slurry was then treated with 70 g. of 9% by weight solution of sulfamic acid, 1.5 g. of oxalic acid, and the temperature was adjusted to 50° C.

The acidic flocculated clay slurry at 50° C. was then mixed with 430 g. of 45% urea-formaldehyde prepolymer, also at 50° C. (The urea-formaldehyde prepolymer is the same as the one used in Example 2A). The condensation polymerization of the urea-formaldehyde prepolymer takes place as soon as it is mixed with the acidic flocculated clay slurry and the exothermic reaction increases the temperature to 63° C. The gel-like mixture was then allowed to cure at this temperature adiabatically for 2 hours.

The gel-like solid mixture was crushed to small pieces and mixed with 1 liter of water, neutralized with a NaOh solution to pH 8.0, filtered, and the filter cake was washed with 100 ml. of water. The filter cake was dried at 75° C. and the dried product was then micropulverized with an impact stud pulverizer.

The initial clay to urea-formaldehyde prepolymer weight ratio of this example was 70 to 30, and the final weight ratio of clay to urea-formaldehyde polymer, as it was determined from % ash analysis, was 79 to 21. The total solids at the gelation step was 33.3% by weight based on the total weight of the reactants.

The clay particles used in this example had an average particle size of $0.4\mu$. The urea-formaldehyde primary particles had an average size of $0.35\mu$. The clay-urea-formaldehyde polymer agglomerates had an average size of $6.5\mu$.

The properties of Example 3A product of this invention are listed in Table IV with the properties of the next Example, 3B product, which was made by Simone's method for the purpose of comparing the two methods.

EXAMPLE 3B

In this example the same raw materials were used as in Example 3A except for the process, which is the same as that described by Simone in his U.S. Pat. No. 3,912,532.

450 g. of kaolin clay were dispersed in 300 g. of deionized water containing in solution 0.45 g. of sodium hexametaphosphate as a dispersant.

The clay dispersion was mixed with 430 g. of 45% urea-formaldehyde prepolymer solution (the same U/F prepolymer as in Example 3A), and the temperature of the mixture was adjusted to 50° C. A solution of 70 g. of 9% sulfamic acid (by weight) was heated to 50° C.

The clay dispersion in the urea-formaldehyde prepolymer was mixed with the sulfamic acid solution and the precipitated resin formed a gel which on standing was allowed to cure for 2 hours at 68° C. adiabatically.

The gelled mass was broken up and was dispersed in 1 liter of water, neutralized with NaOH solution to pH 8.0, filtered, washed with 100 ml. of water, then dried at 75° C. The dried product was then passed through an impact stud pulverizer.

The initial clay to urea-formaldehyde prepolymer weight ratio of this mixture was the same as in Example 3A (70 to 30) and the final clay to urea-formaldehyde polymer weight ratio, as it was determined from % ash analysis, was 78 to 22.

Again, the clay particles used in this example had an average particle size of $0.4\mu$. The urea-formaldehyde particles coating the clay particles had an average size of $0.2\mu$. The coated clay particles had an average size of $6.5\mu$.

The products of Examples 3A and 3B were used in a paper coating formulation as follows:

100 parts of either product from Example 3A or 3B was mixed with 16 parts of a styrene butadiene latex (50% solids).

A 28 lbs./book ream base stock paper was coated on one side with the two coating compositions at a coat weight of 2.3 lbs./book ream.

The coated papers were calendered once at 400 pli and at a speed of 37 feet/minute.

The same products of Examples 3A and 3B were used as filler pigments in paper. The pulp used for this evaluation was 50/50 blend of Hardwood/Softwood Kraft bleached pulp of 400 c.c. Canadian Standard Freeness. The paper formed contained 5%, 10%, and 15%, by weight of the filler pigment based on the total solids of paper. The basis weight of the paper was 50 lbs./book ream.

The results of these comparative evaluations of the products of Examples 3A and 3B, as well as other pigment optical properties, are tabulated in Table IV.

TABLE IV

| | Pigment Properties | | | PAPER COATINGS | | | | | |
|---|---|---|---|---|---|---|---|---|---|
| | | | | Uncalendered | | | Calendered | | |
| Example | Bulk Density g./c.c. | Brightness | Scattering Coefficient Sp, cm²/g | Opacity % | Brightness | Scattering Coefficient Sp, cm²/g | Opacity % | Brightness | Scattering Coefficient Sp, cm²/g |
| 3 A | 0.240 | 88.3 | 2,300 | 89.3 | 76.5 | 3,290 | 87.3 | 73.4 | 2,350 |
| 3 B | 0.256 | 85.1 | 1,470 | 87.7 | 74.2 | 1,980 | 86.1 | 72.3 | 1,790 |
| Clay | 0.280 | 83.8 | 1,120 | | | | | | |

| | PAPER FILLER | | | | | | | | |
|---|---|---|---|---|---|---|---|---|---|
| | % OPACITY % Pigment | | | BRIGHTNESS % Pigment | | | Pigment Scattering Coefficient cm²/g % Pigment | | |
| Example | 5 | 10 | 15 | 5 | 10 | 15 | 5 | 10 | 15 |
| 3 A | 86.3 | 89.1 | 91.0 | 82.6 | 83.7 | 84.3 | 2,310 | 2,240 | 2,140 |
| 3 B | 85.1 | 87.8 | 89.2 | 81.4 | 81.9 | 82.2 | 1,660 | 1,630 | 1,570 |
| | Pulp % Opacity 81.7 | | | Pulp Brightness 80.5 | | | Pulp Scattering | | |

TABLE IV-continued

| | Coefficient 338 |
|---|---|

Table IV shows again that the 3A product of this invention has lower bulk density, higher brightness (by 3.2 points) and higher pigment scattering coefficient (by 36%) than the 3B product of Simone's invention. Also, in paper coatings and paper filler applications, the opacity, brightness and pigment scattering coefficients of product 3A are substantially higher than those of product 3B.

The pigment properties and paper coatings performance of Example 4 A product of this invention are listed in Table V with those of the Example 1 B product, which was prepared using Simone's urea-formaldehyde prepolymer and process.

The coating formulation is the same as in Example 1 A.

TABLE V

| | Pigment Properties | | | Coat Weight lb./Book Ream | PAPER COATINGS | | | | | |
|---|---|---|---|---|---|---|---|---|---|---|
| | | | | | Uncalendered | | | Calendered | | |
| Example | Bulk Density g./c.c. | Brightness | Scattering Coefficient Sp, cm²/g | | Opacity % | Brightness | Scattering Coefficient Sp, cm²/g | Opacity % | Brightness | Scattering Coefficient Sp, cm²/g |
| 4 A | 0.190 | 90.3 | 2,600 | 1.4 | 89.1 | 75.6 | 5,180 | 87.4 | 73.7 | 4,170 |
| 1 B | 0.264 | 88.2 | 2,300 | 2.3 | 88.4 | 74.9 | 2,310 | 87.0 | 73.2 | 2,080 |
| Clay | 0.288 | 84.8 | 1,020 | | | | | | | |

EXAMPLE 4A

The urea-formaldehyde prepolymer used in this example is of this invention and it is the same as it was described in Example 2A.

The kaolin clay used in this example is the same as the one used in Examples 1A and 1B. The only difference between Examples 1A and 4A is that in Example 4A the urea-formaldehyde propolymer of this invention (45% solids) was used, while in Example 1A the urea-formaldehyde prepolymer of Simone's invention (57.85% solids) was used.

The product performance of this Example 4A, made by the process of this invention and using the urea-formaldehyde prepolymer (45% solids) of this invention, is compared in Table V to the product performance of Example 1B, which was made by Simone's process using the urea-formaldehyde prepolymer (57.85% solids) of Simone's invention. Both products had the same initial gelation weight ratio of clay to urea-formaldehyde prepolymer (66.9 to 33.1) and the same final weight ratio of clay urea-formaldehyde polymer (74 to 26).

420 g. of kaolin clay were slurried in 594 g. of deionized water. No dispersant, such as sodium hexametaphosphate, was used. The clay slurry was then treated with 71 g. of 9% by weight solution of sulfamic acid, 1.5 g. of oxalic acid, and the temperature was adjusted to 50° C.

The acidic flocculated clay slurry at 50° C. was then mixed with 462 g. of 45% urea-formaldehyde prepolymer of this invention, also at 50° C. The condensation polymerization of the urea-formaldehyde prepolymer takes place almost immediately and the exothermic reaction increases the temperature to 66° C. The gel-like mixture was then allowed to cure at this temperature adiabatically for 2 hours.

The gel-like solid mixture was crushed to small pieces and mixed with 750 ml. of water, neutralized with a NaOH solution to pH 8.0, filtered, and the filter cake was washed with 80 ml. of water. The filter cake was dried at 75° C. and the dried product was then micropulverized with an impact stud pulverizer.

The superior performance of products prepared by the present invention: forming "structured agglomerates" by an acid treatment of clay platelets and stabilizing the said "structured agglomerates" with a solution of urea-formaldehyde prepolymer of the present invention, over the products prepared according to Simone's invention and his urea-formaldehyde prepolymer, is very clear.

Table V shows that 4 A product of this invention has 28% lower bulk density than Simone's product 1 B. The brightness of product 4 A is 2.1 points higher than the brightness of product 1 B, and the pigment scattering coefficients differ by 13% in favor of product 4 A.

Paper coating performance of Example 4 A product is superior to Example 1 B product, even though the coat weight of Example 1 B product is higher by 64% than the coat weight of Example 4 B product. The superior performance in paper coatings of the product 4 A of this invention over the that of product 1 B of Simone's invention is associated with the superior optical characteristics of the "structured agglomerates" of clay platelets stabilized with the urea-formaldehyde polymeric submicron particles. The said urea-formaldehyde polymer clay "structured agglomerates" contribute to coating film structure more than the products prepared by Simone's invention.

EXAMPLES 5 A, 5 B thru 7 A, 7 B

All these examples were prepared with the same urea-formaldehyde prepolymer as in Example 2 A of this invention. The clay used in these examples had a mean particle size of 0.42 and the brightness through a leaching process was improved from 82.8 in Examples 5 A and 5 B to 88.0 in Examples 7 A and 7 B. All 5 A through 7 A products of this invention have lower bulk densities, higher brightness and higher pigment scattering coefficients than the corresponding 5 B through 7 B products of Simone's invention. In paper coating applications, again, the A products of this invention outperformed the corresponding B products of Simone's invention. The results of these comparative evaluations of the products of Examples 5 A and 5 B thru 7 A and 7 B, as well as other pigment optical properties, are tabulated in Table VI.

TABLE VI

| Example | Initial Clay/Urea Formaldehyde Prepolymer Weight Ratio | Initial Clay/Urea Formaldehyde Polymer Weight Ratio | Total Solids at Gelation Step, % | PIGMENT PROPERTIES | | | | PAPER COATINGS | | | | | |
|---|---|---|---|---|---|---|---|---|---|---|---|---|---|
| | | | | Bulk Density g./c.c. | Brightness | Scattering Coefficient Sp, $cm^2/g$. | Coat Weight lbs/book Ream | Uncalendered | | | Calendered | | |
| | | | | | | | | Brightness | Opacity % | Scattering Coefficient Sp $cm^2/g$. | Brightness | Opacity % | Scattering Coefficient Sp $cm^2/g$ |
| 5 A | 70/30 | 78/22 | 33.3 | 0.145 | 87.7 | 2810 | 1.4 | 76.2 | 88.9 | 4520 | 72.3 | 85.8 | 2840 |
| 5 B | 70/30 | 78/22 | 41.9 | 0.211 | 86.2 | 2195 | 1.4 | 75.1 | 88.2 | 3870 | 73.0 | 86.4 | 2405 |
| Clay | — | — | — | 0.280 | 82.8 | 1120 | — | — | — | — | — | — | — |
| 6 A | 70/30 | 79/21 | 35.1 | 0.178 | 88.6 | 2385 | 1.3 | 75.8 | 87.6 | 4010 | 72.5 | 86.2 | 2580 |
| 6 B | 70/30 | 78/22 | 52.0 | 0.269 | 86.7 | 1230 | 1.3 | 74.0 | 86.6 | 3435 | 71.4 | 85.1 | 1980 |
| Clay | — | — | — | 0.288 | 83.2 | 1110 | — | — | — | — | — | — | — |
| 7 A | 70/30 | 78/22 | 35.1 | 0.176 | 90.0 | 2620 | 1.5 | 76.8 | 89.1 | 3655 | 72.9 | 86.4 | 2235 |
| 7 B | 70/30 | 79/21 | 52.0 | 0.272 | 88.3 | 1710 | 1.5 | 75.1 | 87.9 | 3060 | 71.9 | 85.6 | 1970 |
| Clay | — | — | — | 0.283 | 88.0 | 1115 | — | — | — | — | — | — | — |

In the foregoing specification I have set out certain preferred practices and embodiments of this invention, however, it will be understood that this invention may be otherwise embodied within the scope of the following claims.

I claim:

1. An opacifying pigment for paper coating and paper filler applications comprising structured agglomerates of clay platelets stabilized with urea-formaldehyde polymeric submicron size particles.

2. An opacifying pigment as claimed in claim 1 wherein said clay platelets have a size range from 0.1 to 10 microns.

3. An opacifying pigment as claimed in claim 1 or 2 wherein the urea-formaldehyde pigment particles are in the size range 0.1 to 0.7 microns.

4. An opacifying pigment as claimed in claim 1 or 2 wherein the urea-formaldehyde pigment particles are present in amounts from 5% to 95% by weight, based on the total weight of the stabilized structured agglomerates.

5. An opacifying pigment as claimed in claim 1 or 2 wherein the structured agglomerate product has a size range from 0.25 to 40 microns.

6. An opacifying pigment as claimed in claim 1 or 2 wherein the clay platelets have a size range form 0.1 to 10 microns and the urea-formaldehyde pigment particles are in the size range 0.1 to 0.7 microns and characterized by an open structure with a large number of microvoids.

7. An opacifying pigment as claimed in claim 6 wherein the urea-formaldehyde particles are present in amounts from 5% to 95% based on the total weight of the stabilized structured agglomerates.

8. An opacifying pigment as claimed in claim 6 wherein the structured agglomerate product has a size range from 0.25 to 40 microns.

9. An opacifying pigment as claimed in claim 7 wherein the structured agglomerate product has a size range from 0.25 to 40 microns.

10. The method of forming an opacifying pigment for paper coating and paper filler applications comprising the steps of:
(a) forming a slurry of clay particles,
(b) flocculating said clay slurry with an acid flocculant to form structured agglomerates of clay platelets, and
(c) combining said flocculated clay suspension with a solution of urea-formaldehyde prepolymer to stabilize the structured agglomerates of clay platelets.

11. A method as claimed in claim 10 wherein the structured agglomerates are gelled, cured, crushed, slurried in water, neutralized and removed from slurry suspension, dried and pulverized to desired size to form a final dry product.

12. A method as claimed in claim 10 or 11 wherein the flocculated clay suspension contains a maximum of 40% solids in water and is flocculated at a pH below 3.0.

13. A method as claimed in claim 10 or 11 wherein the urea-formaldehyde prepolymer solution at concentrations of 25% to 50% solids is added to the flocculated clay.

14. A method as claimed in claim 10 or 11 wherein the polymerized mixture of flocculated clay and urea-formaldehyde is formed at 25 to 45% solids.

15. A method as claimed in claim 10 or 11 wherein the flocculated clay suspension is added to a urea-formaldehyde prepolymer solution having a concentration of 25% to 50% solids.

* * * * *

UNITED STATES PATENT AND TRADEMARK OFFICE
CERTIFICATE OF CORRECTION

PATENT NO. : 4,346,178  Page 1 of 2
DATED : August 24, 1982
INVENTOR(S) : PETER ECONOMOU It is certified that error appears in the above-identified patent and that said Letters Patent are hereby corrected as shown below:

Column 1, line 8, "ureaformaldehyde" should read --urea-formaldehyde--.

Column 1, line 12, "of $TiO_2$" should be --for $TiO_2$--.

Column 1, line 66, "th" should be --the--.

Column 2, lines 5-6, "inventioon" should be spelled --invention--.

Column 2, line 10, "Natuurally" should be --Naturally--.

Column 3, line 3, "The" should be --This--.

Column 3, line 29, "U.s." should be --U.S.--.

Column 3, line 63, "of formaldehyde" should read --to formaldehyde--.

UNITED STATES PATENT AND TRADEMARK OFFICE
CERTIFICATE OF CORRECTION

PATENT NO. : 4,346,178

DATED : August 24, 1982

INVENTOR(S) : PETER ECONOMOU

It is certified that error appears in the above-identified patent and that said Letters Patent are hereby corrected as shown below:

Column 4, line 30, "of 68°C." should be --to 68°C.--.

Column 5, line 40, "40 c.c." should be --400 c.c.--.

Column 9, line 27, "NaOh" should be --NaOH--.

Signed and Sealed this

Eighth Day of February 1983

[SEAL]

Attest:

Attesting Officer

GERALD J. MOSSINGHOFF

Commissioner of Patents and Trademarks